(12) United States Patent
Hacker (10) Patent No.: US 6,271,453 B1
(45) Date of Patent: Aug. 7, 2001

(54) MUSICAL BLOCKS AND CLOCKS

(75) Inventor: L. Leonard Hacker, Washington, DC (US)

(73) Assignee: L Leonard Hacker, Washington, DC (US)

( * ) Notice: Subject to any disclaimer, the term of this patent is extended or adjusted under 35 U.S.C. 154(b) by 0 days.

(21) Appl. No.: 09/272,285

(22) Filed: Mar. 19, 1999

Related U.S. Application Data (63) Continuation-in-part of application No. 08/861,284, filed on May 21, 1997, now Pat. No. 5,949,010.

(51) Int. Cl.$^7$ ................................................ G09B 15/02
(52) U.S. Cl. ...................... 84/476; 84/470 R; 446/188; 434/171
(58) Field of Search ................. 84/476, 470 R; 273/146; 434/171, 172; 446/188, 193, 197, 180

(56) References Cited

U.S. PATENT DOCUMENTS

| | | | |
|---|---|---|---|
| 104,833 | 6/1870 | Costello et al. | 84/476 |
| 430,157 | 6/1890 | Watson | 84/476 |
| 491,833 | * 2/1893 | Bowen | 84/476 |
| 1,772,394 | 8/1930 | Hanselmann | 446/153 |
| 2,879,685 | 3/1959 | Page | 84/470 |
| 2,941,436 | 6/1960 | Ericksen | 84/473 |
| 2,985,453 | 5/1961 | Matisz | 273/145 |
| 3,795,989 | 3/1974 | Greenberg et al. | 35/9 B |
| 4,158,921 | 6/1979 | Stolpen | 35/70 |
| 4,281,578 | * 8/1981 | Tanimoto et al. | 84/470 R |
| 4,398,892 | 8/1983 | Solomon | 434/259 |
| 4,651,613 | * 3/1987 | Harrison | 84/95.2 |
| 4,838,794 | 6/1989 | Coddington | 434/187 |
| 4,846,687 | 7/1989 | White et al. | 434/112 |
| 4,924,743 | * 5/1990 | Tsai | 84/476 |
| 5,275,567 | 1/1994 | Whitfield | 434/113 |
| 5,447,433 | 9/1995 | Perry | 434/171 |
| 5,769,682 | * 6/1998 | DiResta et al. | 446/184 |

FOREIGN PATENT DOCUMENTS

743653 * 1/1956 (GB).

* cited by examiner

Primary Examiner—Shih-Yung Hsieh
(74) Attorney, Agent, or Firm—Roberts Abokhair & Mardula LLC (57) ABSTRACT

A music education apparatus for teaching musical concepts, comprising note meaning and pitch recognition, music reading, instrument playing, tempo, staccato, degrees of loudness, note duration, rhythm, harmony, chords, trills, the sonic characteristics of different instruments, and music writing. The music education apparatus comprises a block with visual representations on each side designating musical notes, letters representing musical notes, and physical portions on musical instruments, wherein the musical note(s) designated on the other sides are highlighted on the keyboard or other designated physical portion of an instrument. The music education apparatus may also serve as an alarm clock that can be set to sound at a selected time by conventional means, or by light, sound, temperature, or other stimuli. Voice programming may be featured, whereby a word, name, sentence, etc., is spoken or sung when the alarm sounds. Sides of the music education apparatus may designate one note or a combination of notes, and a keyboard or other physical representation of the playing portion of a musical instrument, wherein a key(s) or string(s) is highlighted to correspond to the note(s) designated on the other sides of the block. Upon activation of a music generator contained within the music education apparatus, the pitch(es) of the designated note(s) is sounded. By including the production of harmonics, the sound producer can also produce the sound of a musical instrument. One embodiment features removable and replaceable sides that thereby permit the sounding of different notes, including combinations of notes (trills, etc.), instruments, and songs or other compositions. Electronic sound chips may be used in conjunction with a power source.

7 Claims, 7 Drawing Sheets

MUSICAL BLOCKS AND CLOCKS

REFERENCE TO RELATED APPLICATIONS

This application is a continuation-in-part of related application having a Ser. No. 08/861,284 filed on May 21, 1997 now U.S. Pat. No. 5,949,010.

BACKGROUND

The present invention relates generally to an educational musical toy and/or game for teaching musical concepts. In particular, the present invention relates to a block musical toy and/or game to teach musical note meaning and pitch recognition, music reading, and instrument playing (key, string, finger button or finger hole recognition, including, for example, note-key and pitch-key correspondences).

The learning of music comprises learning one or more of the following: pitch and the correspondence between written note and pitch, tempo, staccato or not, degrees of loudness, note duration, correspondence between written note and the production of instrumental sound (e.g., by striking a key, plucking a string, blowing on a reed and pushing a key, pressing a finger button or key lever, placing a finger on a finger hole, etc.), rhythm, the sonic characteristics of the various instruments, writing music, singing, harmony, chords, trills, etc.

Current devices and methods to help students learn music are somewhat limited. United States patents on such devices and methods include U.S. Pat. No. 2,941,436 to Ericksen, which teaches a flat device that is used to identify musical notes printed on a page.

U.S. Pat. No. 2,879,685 to Page teaches the use of a musical teaching device that incorporates a series of squeezable blocks, each of which is labeled with a note between A and G. The squeezable blocks are mounted on a stiff sheet on which is imprinted a G Clef and music lines, and each squeezable block represents a corresponding note thereon. When a block is squeezed, the air that is forced out of the block passes through a reed tuned to the frequency/pitch of the labeled note.

Other general educational devices include blocks used to teach the alphabet and simple words, such as U.S. Pat. No. 4,158,921 to Stolpen. This patent discloses the use of blocks and other geometric shapes with different letters and words on each of the facets. The words may relate to a given topic, such as geography, chemistry, vocabulary, etc.

U.S. Pat. No. 4,846,687 to White, et al. teaches the use of cubic blocks with alphabet and corresponding sign language indicia on the facets. A facet may also include a picture of an item whose name begins with a letter on another facet of the same block.

U.S. Pat. No. 4,838,794 to Coddington discloses the use of blocks to teach the metric system. On each facet is inscribed a metric length (including an imprinted ruler) or a metric volume. A set of blocks, laid end to end, comprises a length of one meter.

U.S. Pat. No. 5,275,567 to Whitfield teaches the use of blocks to teach Braille to sight-impaired children. A front facet may display, for example, the letter A, including the Braille representation; and the opposite or back facet may display only the Braille.

U.S. Pat. No. 5,447,433 to Perry, Jr. utilizes interconnecting blocks with letters and pictures that, upon completion by connecting the blocks in any one of a limited series of predetermined sequences, produces a corresponding unified picture sequence and the word for the picture sequence is spelled.

The above discussed inventions, though helpful within their prescribed limits, do not provide the degree of flexibility and interest-attracting ability that is necessary to adequately teach many of the complexities of music, including both children and adults. Thus, there is a need for a student's music teaching system to teach selected aspects of music whereby the attention of a student is held sufficiently strongly to aid the learning process. In the case of individuals with Attention Deficit Disorder (ADD), there is an even greater need for improvements in attention holding means for student teaching systems. Also, there is a need for a student's music teaching system to teach selected aspects of music whereby there is flexibility sufficient to permit the teaching of more than merely simple concepts, especially to older students and to musically precocious children. One example of a more complex music concept requiring a more flexible student's music teaching system for implementation is that of determining which keys to strike on a piano, for example, and in what order, to produce a desired song. Of course, a need also exists for a more flexible student's music teaching system for determining which strings to pluck or otherwise vibrate (or, generally, which sound initiator to engage) in a given other instrument to produce each note comprising a desired song. Another example of a more complex music concept requiring a more flexible student's music teaching system for implementation is that of composing music, including being able to hear the sequence of notes for a composition in progress or even one completed. Finally, there is a need for a student's music producing system that not only is highly flexible and inexpensive, but also promotes eye-hand coordination and general fine control of the muscles controlling the fingers of the student user.

SUMMARY OF THE INVENTION

In view of the limitations in the prior art, as discussed above, it is an object of the present invention to provide a music teaching device that strongly holds the attention of students, including those with ADD.

Another object of the present invention is to provide a music teaching device that has the flexibility necessary to teach more complex concepts, such as chords, intricate note combinations, etc., to children and adults, regardless of musical ability.

It is another object of the present invention to provide a music teaching device that, by virtue of the auditory feedback, permits the user to determine which piano keys, and their sequence, must be played in order to perform a given song.

Yet another object of the present invention is to provide a music teaching device that, in part by virtue of the auditory feedback, permits the user to determine which strings must be plucked, strummed or otherwise vibrated (or, generally, activation of which other sound producing elements or sound initiators) in a musical instrument in order to perform a given song.

Still another object of the present invention is to provide a music teaching device that, in part by virtue of the auditory feedback, permits the user to more easily compose music.

It is another object of the present invention to provide a music teaching device that simultaneously is flexible, inexpensive, and promotes eye-hand coordination and general fine control of the muscles controlling the fingers of the user.

The present invention accomplishes the above objectives by using special musical blocks, the sides of which carry visual representations of musical indicia. The musical indicia may comprise such items as notes (including single or multiple whole notes, half notes, quarter notes, etc.), the alphabetic representation of those notes (letters A through G), G or treble clefs, F or bass clefs, representations of physical portions of musical instruments (such as key boards, strings, finger holes, finger buttons, key levers and any other such sound initiators and/or sound producers; including also highlighting of the note(s) featured on the musical block), sharps, flats, representations of songs, etc. In the simplest embodiment, cubic blocks comprise: two of the six sides are printed with at least one letter corresponding to one or more notes (between A and G), two carry a representation of a physical section of a piano keyboard (or the sound initiator of another musical instrument) wherein the key corresponding to the single note or multiple notes represented by the block is/are highlighted, and two sides carry a representation of a musical score with the single or multiple notes indicated thereon. The cubic blocks may be made of wood, plastic, cardboard, rubber, metal, firm or reinforced cloth or fabric, or any other material suitable for students known in the art.

When a single note is featured on each block, a unique color may be selected to correspond to each of the seven notes between A and G to further aid the user in quickly identifying each of the notes. In one embodiment, the present invention comprises a set of at least seven blocks, wherein each block comprises a note on a musical scale. Each block comprises at least one side, showing each of the letter designation of a note, the staff position of the note, and the position of the note on a musical instrument. The set comprises at least one block for each note in a musical scale. The blocks each may also contain a reed that is tuned to the indicated note, and a hole through the block to provide a means for air to flow through the reed. The reeds may then be activated by blowing through the connecting hole. The note can also be played by squeezing the block in the case where the blocks are made of a flexible material that is non-porous, such as rubber, plastic, treated fabric, etc. The size of the music blocks may vary, for example, with larger blocks being used for younger and/or less dextrous students.

The music block or blocks are of different shapes. The block should have at least three sides to show the various musical representations. In various embodiments, the blocks are in the shape of a pyramid, a cube of equal or different sides, or a structure wherein each side has more than four edges. When a set is utilized, the blocks in the set can be of similar or different shapes. Each block has sufficient surfaces to depict the note, the letter designation, and the related musical instrument position.

With respect to the colors used to distinguish the different notes, it is important to realize that the present invention is not bound to any one color scheme; thus, any combination of colors that provides a 1:1 correlation between color and note will suffice. In addition, an alternative embodiment of the present invention uses different shades of the same color to distinguish different octaves for a given note.

One alternative embodiment of the present invention is the use of more than one reed in a music block. For example, in the squeezable musical block having different notes on different front-back pairs of sides, squeezing one set of opposite sides will produce the sound of the notes shown on those sides, and so forth for the other opposite side pairs. In the more rigid blocks, in which notes are produced by blowing through holes/tubes connected to the reeds, the front-back pairs of holes/tubes are matched with the corresponding notes represented on the respective sides of the musical blocks.

Other alternative embodiments of the present invention include the use of representations of keys and other sound initiators other than from a piano, such as strings of a violin, harp, or other string instrument, finger holes on harmonicas and certain wind instruments, key levers and finger buttons on saxophones and other wind instruments, etc.

Another alternative embodiment of the present invention is the use of an internal switch that is activated by mere movement of the block. In addition, other switches, both internal and external, may be used, including switches coupled to sensors (such as for light, sound, pressure, temperature, etc.) so that the block will sound when light or temperature reaches a desired level, etc.

Another alternative embodiment of the present invention incorporates such features as length of note concept (whole, half, quarter, eighth, etc., notes), F (or bass) and G (or treble) clef concepts, sharp and flat concepts, and note combinations.

Yet another alternative embodiment of the present invention includes the use of an electrically powered (for example, by providing a connection to an AC outlet, by a battery housed internally, and/or solar panels placed externally on the block, plus an externally activated switch) sound producer whose output is tuned to match the frequency(ies) of the note(s) designated on the blocks. Using modern electronic sound makers, for example including sound chips, such an electrically powered sound maker also can reproduce the specific sound of the instrument designated on the given block by sounding a tone that comprises the note's pitch plus the harmonic frequencies appropriate to the instrument, and at the appropriate relative amplitudes. Also, note combinations may be reproduced by such modern sound makers, including even an entire song or a symphonic production. In the case of a music block with more than one set of front side-back side combinations of notes, appropriately placed switches will allow activation of the desired note or combination of notes.

A further alternative embodiment of the present invention is the use of a heat and/or light activated sensor that functions as a switch such that, for example, when one or more musical blocks are positioned at night in a window sill or otherwise in a location that will receive the first rays of light in the morning, the note or the combination of notes will play and function as an alarm clock. In addition, sound activated switches/sensors may be employed such that the clapping of hands, for example, will cause the one or more musical blocks to sound. Furthermore, temperature activated switches/sensors may be used so that the musical block is sounded when the temperature reaches a set higher or lower temperature.

Yet another alterative embodiment of the present invention is the incorporation of a programmable alarm clock in a musical block such that the child may select which note or combination of notes, as well as which instrument or instruments, will serve to awaken him on a given day.

Yet a further alternative embodiment of the present invention is the incorporation of voice chips in a programmable alarm clock embodiment such that the child may choose what message is spoken or sung when the alarm sounds, including the incorporation of the child's name in such a spoken or sung message that is selected, hereinafter termed "voice programming."

Yet another embodiment of the present invention is the inclusion of removable and replaceable faces to a musical block such that the child may select not only which instrument or which combination of instruments, but also which combination of notes or even an entire song he desires by virtue of using the appropriate musical chips within each removable and replaceable or face, including the use of electrically conducting interconnections to access the electrical energy of a power source, such as a battery or a solar panel. In addition, electronic displays may be incorporated within the removable and replaceable faces, including, for example, LCD's (liquid crystal displays).

Yet an additional embodiment of the present invention is the inclusion of removable and replaceable faces to a musical block as above such that delays of a second or so occur between the sounding of each of a series of notes, possibly including the intermixing of instruments that may play at different times in a given sequence of notes. Alternatively, a plurality of blocks could perform as a symphony, with each block representing at least one instrument. Another alternative embodiment of the present invention is the incorporation of higher and lower octaves of notes, especially for the more advanced users.

DESCRIPTION OF THE PREFERRED EMBODIMENTS

The present invention constitutes a marked advance in the field of educational toys or games for teaching music. Generally, children from age 5 to 10 may benefit most from the advanced features of the present invention, though younger children who are musically precocious may also benefit, as may adults beginning to learn music. In addition, those with ADD will benefit from the present invention because of the advanced features that more strongly hold their attention.

Figure 1A:
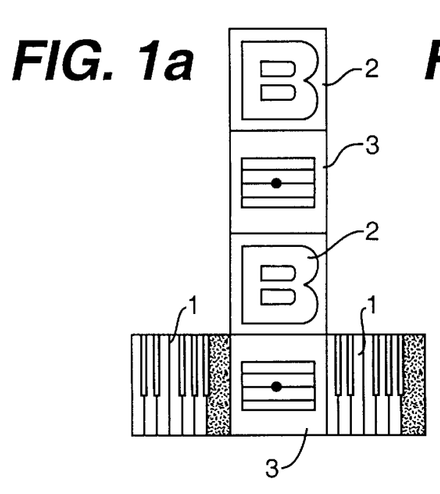
FIGS. 1a and 1b shows a music block representing the note B.
Figure 1B:
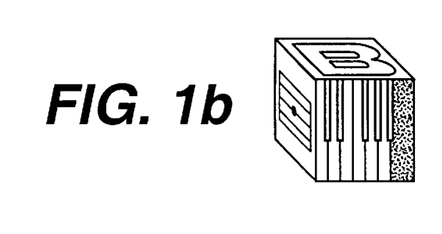

Referring to FIG. 1, in its most elementary embodiment, the present invention comprises a cubic block having six square sides, or three sets of two opposing sides, each side with designations of visual representations of musical indicia. Examples of musical indicia include one or more whole notes, half notes, etc., G or treble clefs, bass or F clefs, representations of physical portions of musical instruments including highlighted keys (or other sound producers or sound initiators, such as keys, strings, finger buttons, key levers, finger holes, etc.), sharps, flats, representations of songs, etc. One set of two opposing sides represents a selected music note between A and G. Another set of two opposing sides shows the selected music note on a music score. The remaining set of two opposing sides shows a visual representation of a physical section of a keyboard with the selected note key highlighted. In other embodiments, other sound initiators are used, such as highlighting a string on a visual representation of a physical portion of a string instrument or a finger button, key lever or finger hole on a wind instrument. Thus, the student not only may learn the notes by name, and the note's position on a music score, but also the corresponding note key or other sound initiator on the keyboard or corresponding portion of a non-keyboard instrument.

Visual representations refer to "life like" representations, or stylistic representations that symbolize the desired instrument, etc., in a manner that is readily understandable by the average person. Furthermore, visual representations of song may include the opening notes (or opening phrase) of the song and/or the written name of the song.

Figure 5:
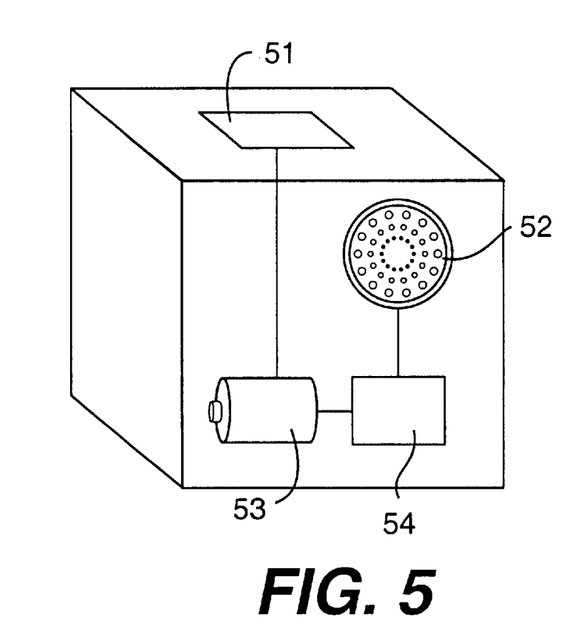
FIG. 5 shows a music block with various parts.
Figure 6:
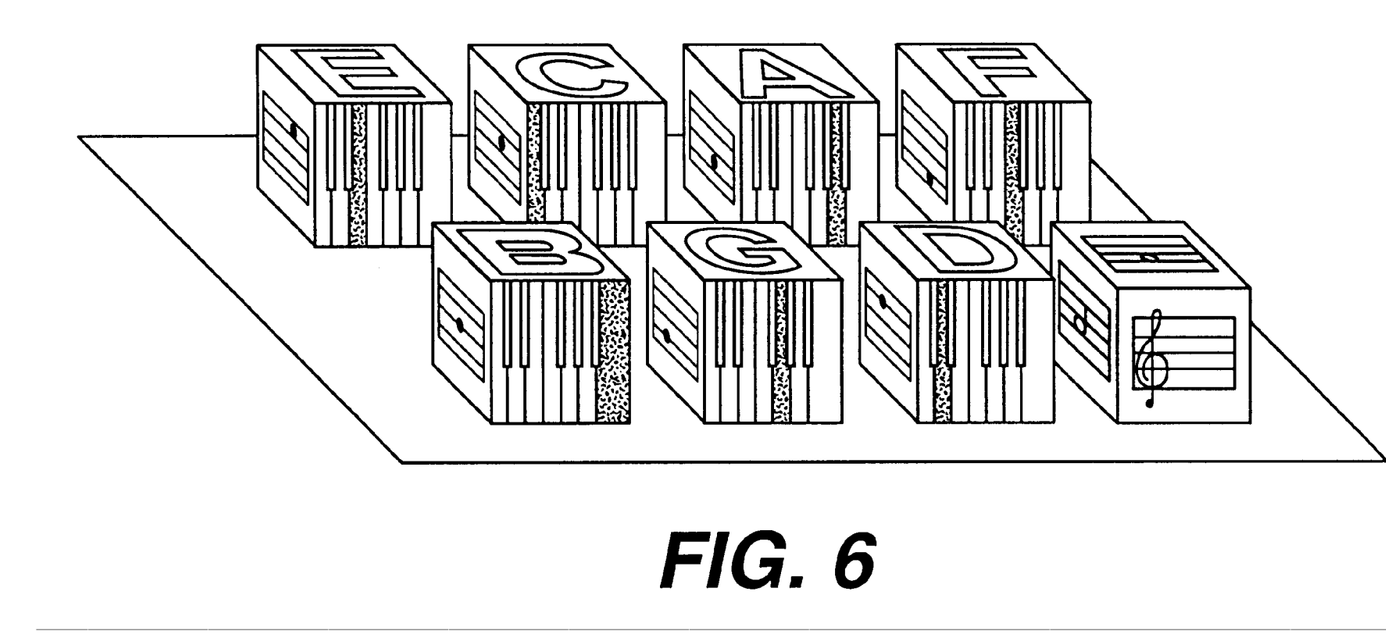
FIG. 6 shows a set of music blocks.
Figure 7A:
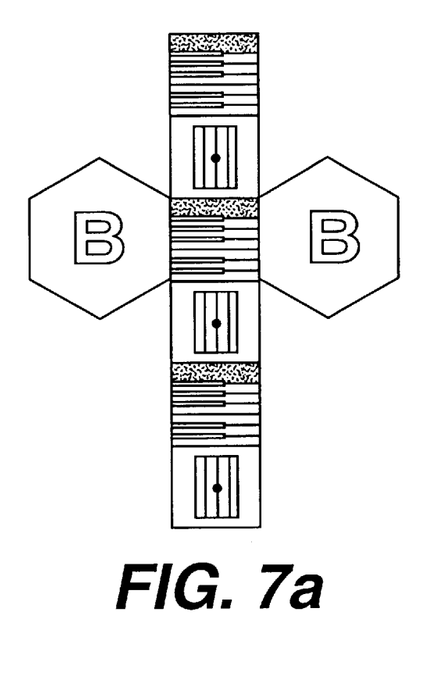
FIGS. 7a and 7b shows a music block having 8 sides.
Figure 7B:
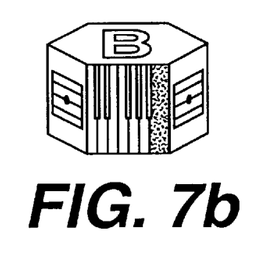
Figure 8A:
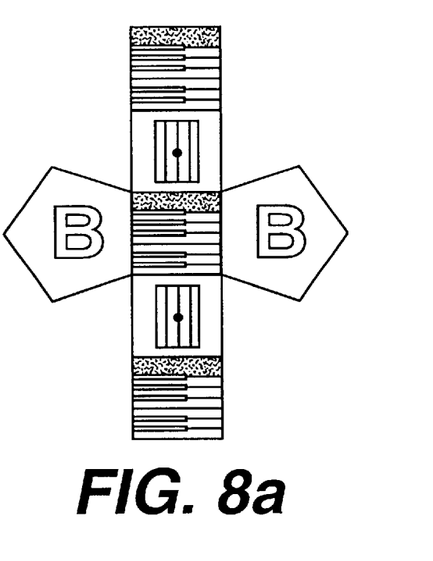
FIGS. 8a and 8b shows a music block having 7 sides.
Figure 8B:
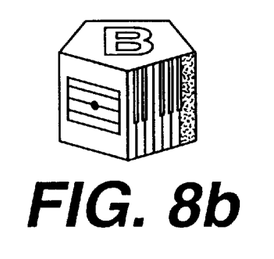
Figure 9A:
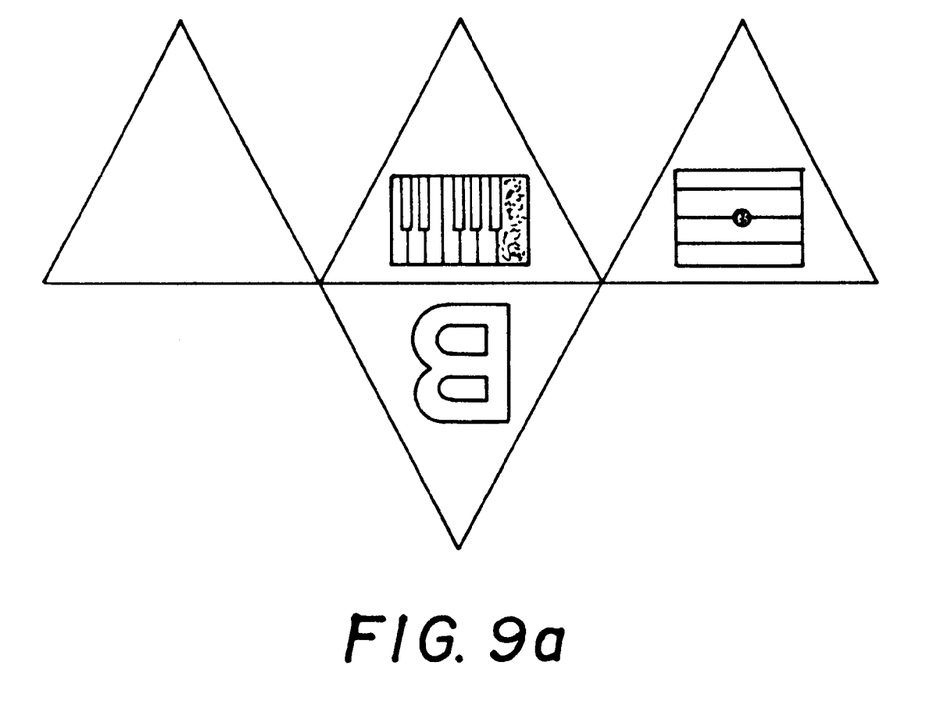
FIGS. 9a and 9b shows a music block having 4 sides.
Figure 9B:
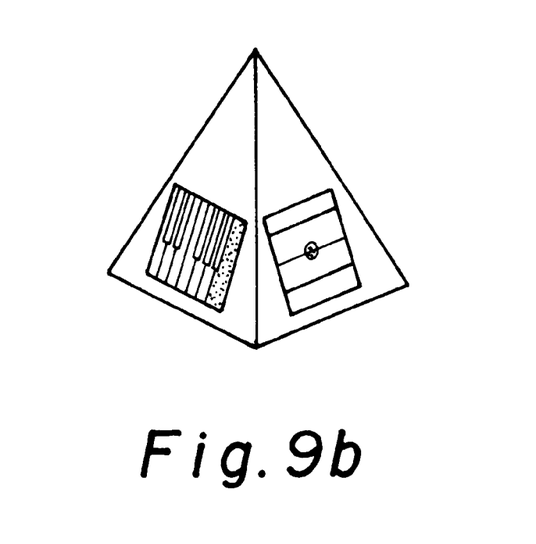

In a more advanced embodiment, and as shown in FIG. 5, the same music blocks may incorporate one or more sound makers 52 into a block. In the simplest such embodiment, the sound maker is a reed that is tuned to the frequency of the note that the block represents.

Figure 10:
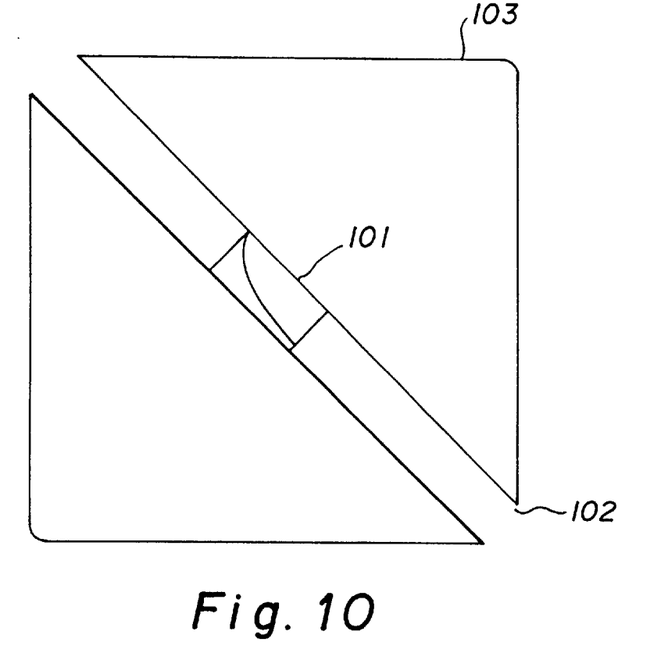
FIG. 10 illustrates a cross section of an embodiment of a musical block of the present invention incorporating a reed activated by blowing.
Figure 11:
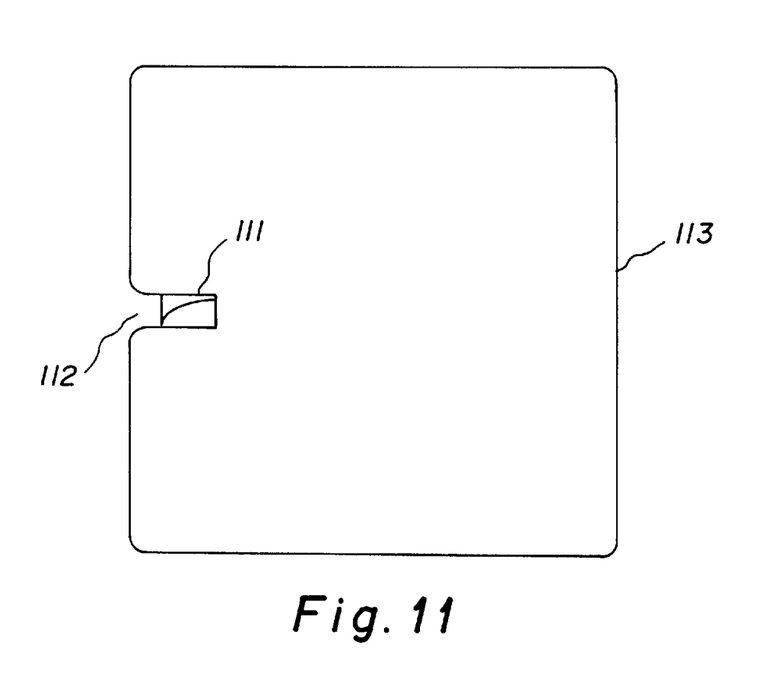
FIG. 11 illustrates a cross section of an embodiment of a musical block of the present invention incorporating a reed activated by squeezing.

As illustrated in FIG. 10, activation of the reed 101 may be by blowing air through an entry-exit hole 102 in block 103, or in the case of a block made of flexible, non-porous material, as illustrated in FIG. 11, activation of the reed 111 may be by squeezing the block 113 to force internal air out of the block by way of the reed 111 and the hole/tube 112 to which it is coupled. In FIG. 5, involving a more complex embodiment, the sound maker 52 may comprise any electronic sound maker that in turn is controlled by a sound chip 54, where, again, the pitch of the electronic sound maker matches that of the note represented by the block. In an even more complex embodiment, the electronic sound maker and sound chip together produce a tone that substantially duplicates the sound of the piano or other instrument for the designated note by incorporation of the appropriate harmonics of the note's pitch, including the appropriate relative amplitudes of those harmonics. (Harmonics refer to various multiples of the pitch or frequency of a note.)

Activation of an electronic sound maker may be by any means known in the art, including but not limited to a push button or other switch 51, which could also be a motion-activated switch, a pressure-activated (for example, piezoelectric) switch, a mercury switch, a light activated switch, a temperature activated switch, a sound activated switch, etc. Such switches 51 typically incorporate appropriate sensors (for example, for heat, light, pressure, sound, etc.) that in turn are connected to a switch proper. Thus, a music block may sound when the temperature reaches the set point of the temperature sensor, for example; or when a loud noise is made, for example, the clapping of hands. A power source 53, such as a battery, is included to power each block.

The musical blocks of the present invention may be made of any conventional material that is safe for contact with human skin, such as wood, metal, various plastics, cardboard, rubber, firm or reinforced cloth or fabric, or any other suitable material. When the musical blocks are to be squeezable, the construction material may be of a flexible, non-porous material such as plastic, rubber, reinforced cloth, etc. Reinforced cloth or fabric may include cloth or fabric that covers a block made of any of the firmer materials.

The surface designations may be made on the sides of the musical cubes by any conventional means, as will be immediately apparent to those skilled in the art. For example, the depictions may be produced on the surface of one material and then attached to the surfaces of the block by conventional means, such as glue or other adhesive or other attachment means (for example, Velcro™, snap, clip, slide, etc.). Alternatively, the designations may be produced directly on the surfaces of the musical block by conventional means, such as ink, carving, etching, photoengraving, etc.

The size of the musical blocks may vary according to the intended user. For example, if the intended users are younger children or children whose motor functions are less developed, the musical blocks may be larger. Conversely, older children or children with more advance motor skills (i.e., more dextrous) may use smaller musical blocks.

The music block or blocks are of different shapes. The block should have at least three sides to show the various musical representations. In various embodiments the blocks are in the shape of a pyramid, a cube of equal or different sides, or a structure wherein each side has more than four edges. When a set is utilized, the blocks in the set can be of similar or different shapes. Each block has sufficient surfaces to depict the note, the letter designation, and the related musical instrument position.

Other embodiments of the present invention (not shown in the Figures) may utilize visual representations of virtually any musical instrument, such as oboe, flute, trombone, clarinet, trumpet, bass viola, harp, harmonica, saxophone, etc. In addition, when an electronic sound maker is used with a musical block designating an instrument, the sound of the specific note as well as the specific instrument may be produced by sounding the pitch of the designated note and the harmonics appropriate for the instrument, including the appropriate relative amplitudes of those harmonics.

Figure 2A:
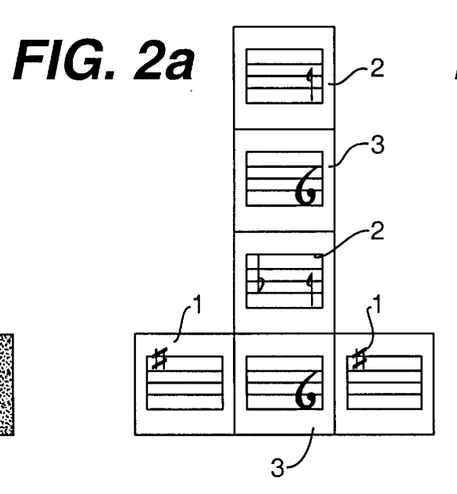
FIGS. 2a and 2b shows a music block with a bass clef (or F clef), B flat, and F sharp.
Figure 2B:
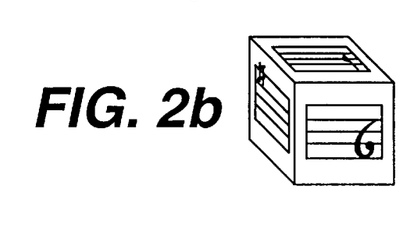
Figure 3A:
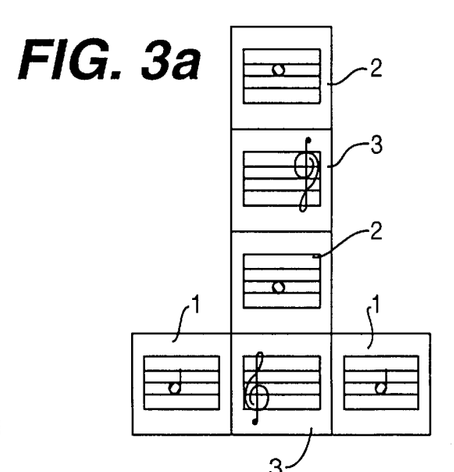
FIGS. 3a and 3b shows a music block with a G (or treble) clef, the whole note, and the half note.
Figure 3B:
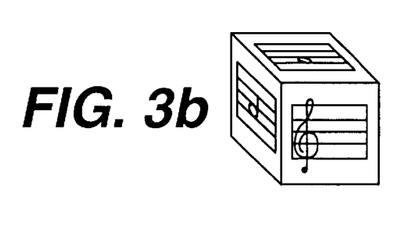
Figure 4A:
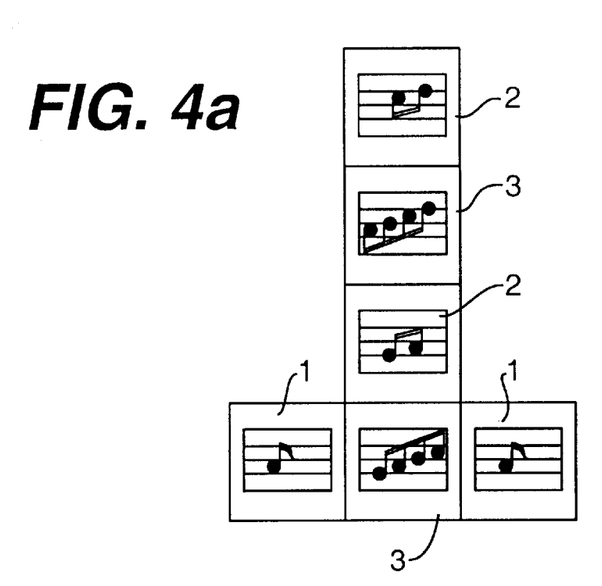
FIGS. 4a and 4b shows a music block with a single eighth note, two adjacent eighth notes, and four consecutive sixteenth notes.
Figure 4B:
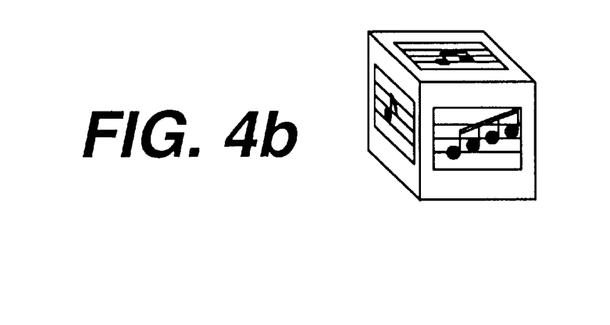

Referring to FIGS. 2, 3 and 4, in embodiments incorporating the concepts of lengths of note or combinations of two or more notes, an electronic sound maker clearly could be used to reproduce the given combination of notes (including a whole song), and, again, with the sounds of the notes being specific for the musical instrument selected for the musical block. In FIG. 2, a B flat and an F sharp are featured, along with the F clef or bass clef.

In FIG. 3, whole and half A notes are shown, in addition to a G or treble clef.

In FIG. 4, an eighth single A note is shown on two sides, and double or quadruple sixteenth note combinations are shown on the other sides.

In musical blocks with more than one note or more than one combination of notes, the electronic music makers may be activated by appropriately placed switches or other activation means.

The various indicia on any one block correspond to each other. For example, in FIG. 1, two sides show the letter B, and two sides show the position of the B note on a musical scale. The remaining two sides show the location of a B note on a piano keyboard. The musical block of FIG. 1 can have blank faces instead of showing each corresponding depiction of the B note on two faces. One face for each depiction is sufficient. Accordingly, using the term "correspond" or "related" to each other means that the music indicia on each face of the block relates to the same musical note or notes. The indicia are not random and unrelated.

Figure 12:
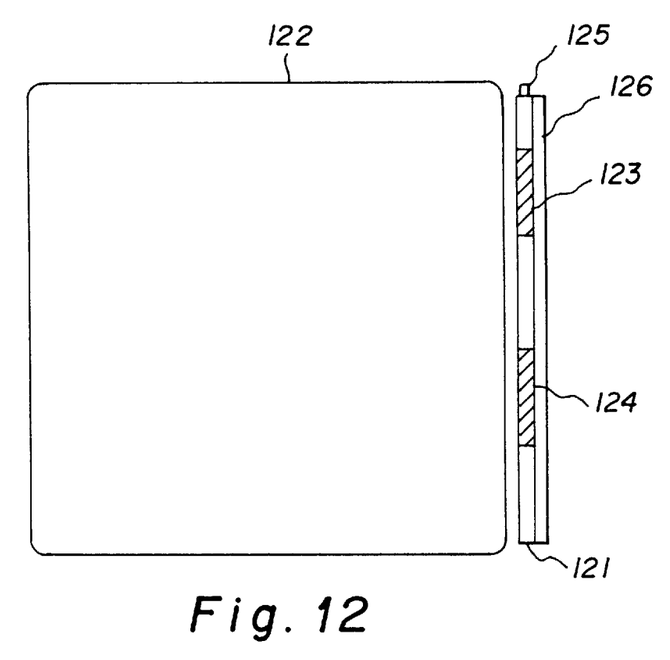
FIG. 12 illustrates a side view of an embodiment of a musical block of the present invention incorporating a removable side with programmable electronic means and an LCD display.
Figure 13:
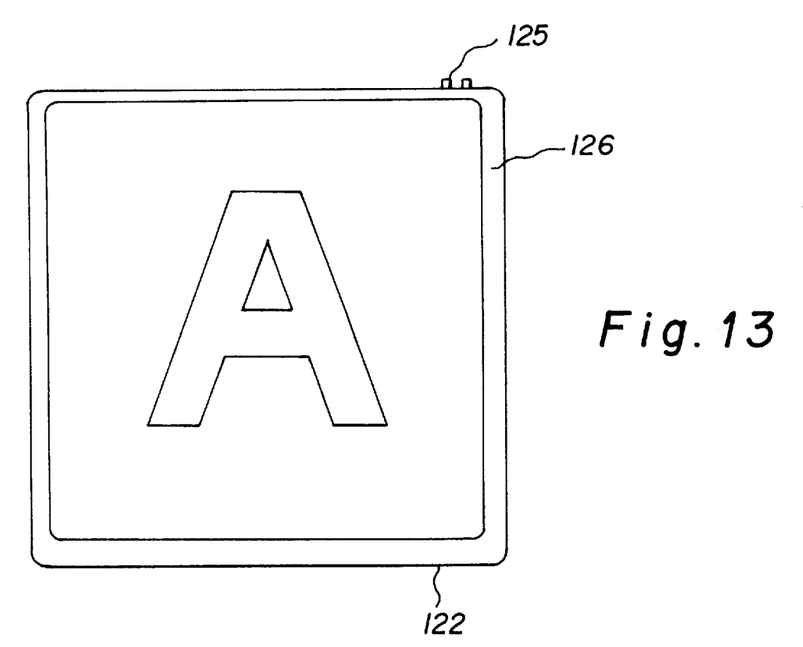
FIG. 13 illustrates a front view of an embodiment of a musical block of the present invention incorporating a removable side with programmable electronic means and an LCD display.

In an alternative embodiment of the present invention, illustrated in FIGS. 12–13 the musical blocks may incorporate additional sides 121 that may be added on top of an existing original side(s), 122 wherein such additional sides 121

1) feature additional notes and/or instruments from those on the underlying block, 2) include at least one sound chip 123 imbedded within the additional side 121, wherein the sound chip 123 may be programmed to sound one note or a combination of notes (including a whole song), and may also sound the note or combination of notes according to a selected musical instrument(s), 3) include connection means (pressure fitted electrical connection, for example) to provide electrical continuity with an internal battery or other electrical energy source, 4) optionally may include an attachment means, including electrical connection means, for additional sides to be attached on top of the first attached additional side such that more than one note, and/or more than one instrument, may play either concurrently or in the sequence as added, and 5) optionally include voice programming, 124 whereby the musical block may play back—including by singing—a name, word, sentence, or paragraph that is spoken into the musical block by a student or other user.

The attachment means may be by clip, snap, slide, magazine (into which one or more additional sides may slide, including in a stacked arrangement), etc., as will readily be apparent to one skilled in the art. In addition, electronic display devices (for example, LCD's, etc.) may be incorporated into the replaceable sides, wherein a single display may depict a musical score, one or more notes, a physical portion of a musical instrument, etc.

In one embodiment, the present invention comprises a set of at least seven blocks, wherein each block comprises a note on a musical scale. Each block comprises at least one side, showing each of the letter designation of a note, the staff position of the note, and the position of the note on a musical instrument. The set comprises at least one block for each note in a musical scale.

In yet another embodiment of FIGS. 12–13 of the present invention, a conventional programmable alarm clock 125 may be incorporated into the sound chip 123 of the musical block. Such an alarm clock 125 may use an electronic display 126, such as an LCD, and be activated to sound the selected note or combination of notes (as well as the selected instrument or combination of instruments) at the time dialed in. Alternatively, a light- and/or temperature-activated switch may be utilized where it is desired to have an alarm clock that awakens the user when the sun comes up, or when the temperature reaches the desired lower or upper temperature.

In another embodiment of the present invention, a series of programmable alarm clocks, each in a different musical block, may each include one or more sound chips which in turn may each sound a different note or combination of notes (including a whole song), and/or a different instrument or combination of instruments. Further, each block may contain an electromagnetic reception means, such as infrared, radio, visible light, ultrasonic, etc. Even further, a separate programmable unit may be employed such that any combination of sequences or concurrent combinations of notes and/or instruments may be activated when the alarm sounds, wherein the programmable unit transmits the selection via an electromagnetic propagation means that matches the electromagnetic reception means of the musical blocks. Similarly, a series of blocks may represent a series of musical instruments, which together may perform a symphony or other musical presentation. The electronic reception means may also be embedded within the replaceable sides. Thus, this embodiment will permit the user to program a selected series of individual notes or a selected series of note combinations (including whole songs) so as to create a song or a musical phrase, or even an entire concert in the desired combination—much like one may program the sequence of selections on one or more CD's in a multiple-CD player. Thus, the student may, for example, employ music blocks representing a range of instruments and thereby be able to determine which combination of instruments best accomplishes the desired sonics for a given music composition.

In addition, voice programming may be incorporated so that the user's name, for example, is sounded by spoken word or sung word when the alarm sounds; and this may be effected in combination with one or more notes being sounded, including a whole song. Voice programming is effected by any conventional means well known in the art. For example, voice programming is used in a variety of children's toys and dolls.

Though the present invention has been described above according to the indicated embodiments, the skilled artisan will readily understand that additional embodiments may be performed without departing from the spirit and scope of the present invention as described.

I claim:

1. A music education apparatus comprising:

a block having at least four enclosing sides comprising musical designations, wherein at least two of the designations:

are different and comprise visual representations of musical indicia (i) of at least one musical note as used in writing music compositions and (ii) the note's physical location on a musical instrument; and wherein the musical indicia on at least two sides correspond to the same at least one musical note, further comprising a music generator having a reed that is activated by the passage of air through a hole which connects the reed to two sides of the block, wherein the reed is activated by blowing through the hole, and wherein the sound of the music generator corresponds to the musical note depicted on the block.

2. A music education apparatus comprising:

a block having at least four enclosing sides comprising musical designations, wherein at least two of the designations:

are different and comprise visual representations of musical indicia (i) of at least one musical note as used in writing music compositions and (ii) the note's physical location on a musical instrument; and wherein the musical indicia on at least two sides correspond to the same at least one musical note, further comprising a music generator including an electronic music generator incorporating programmable logic so as to function as an alarm clock, and wherein the sides are removable and replaceable.

3. The music education apparatus according to claim 2, wherein the alarm clock comprises at least one sensor, and the at least one sensor is activated by at least one member of the group consisting of light, sound, and heat.

4. The music education apparatus according to claim 2, wherein at least one of the removable and replaceable sides comprise at least one electronic music generator that electronically produces a tone that is substantially identical to the pitch of the at least one note designated on the sides of the block.

5. The music education apparatus according to claim 4, wherein the removable and replaceable sides each comprise an electronic display.

6. The music education apparatus according to claim 5, wherein the electronic display comprises a liquid crystal display.

7. The music education apparatus according to claim 2, wherein the removable and replaceable sides further comprise voice programming.

* * * * *